UNITED STATES PATENT OFFICE.

RICHARD GUELTON, OF NEW YORK, N. Y.

IMPROVEMENT IN THE MANUFACTURE OF ARTIFICIAL MARBLE.

Specification forming part of Letters Patent No. 181,332, dated August 22, 1876; application filed October 15, 1875.

*To all whom it may concern:*

Be it known that I, RICHARD GUELTON, of the city, county, and State of New York, have invented an Improvement in Manufacture of Artificial Marble, of which the following is a specification:

To form artificial marble I employ, as others have done, a liquid cement or plaster which, in crystallizing, becomes sufficiently hard to receive a high polish.

To imitate fine black marble without veins, (which has hitherto been impossible on account of the white grains formed in the cement or plaster,) I mix my cement with a vegetable or animal black and water, and spread it out on a plane surface, whether for blocks or molded shapes. After this has been done, and crystallization has taken place, I fill the pores with the same cement already colored black, and, after the crystallization of this layer, I polish it off with stone and water; then I fill up the remaining pores with the same blackened cement. After this operation has been performed I spread over all a layer of black liquid composed of coloring matter and nitrate of iron, the object of which is to blacken the white grains that are formed on the surface. Half an hour after this has been laid on I wash the block or mold with a sponge and water, and polish it with the same stone that I use for marble. I leave the block for an hour to dry, and then spread over it another layer of nitrate of iron. After this I wait a half hour and repeat the washing process. When these operations are done I polish just as I would real marble, and the block is then ready for the market.

To represent any object or incrustation in marble, I follow this method of operation. Once my marble has become hardened without being fully crystallized, I cut it up according to the form of the object I wish to represent, and when I have thus cut it up I fill it with another marble to make the base, and after crystallization I fill it up again.

When I mix my cement or plaster I put into a gallon of water three or four drops of soluble glass and a small quantity of manganese, and when my cement or plaster is set I put on the surface with a brush a coat of soluble glass mixed with the white of eggs, and then when the soluble glass has penetrated into the marble, I wash it off with a sponge and water, and then I put on another coat with half water and half soluble glass. This makes my marble become hard, and it will not absorb any water or acids.

Veined marble may be produced by tracing on the slab or other flat surface upon which the cement is to be poured the veins of the marble I wish to imitate. This may be done with silk thread which has been previously moistened with mineral-water colors. A layer of cement is then spread out over the threads and the latter are withdrawn after having served by their imprint to form the veins, and the cement is then leveled off in order to fill up the spaces left by the threads.

To imitate pebbled marbles, such as brocatel granite, porphyry, &c., liquid shaded cement is spread over a sieve placed upon the slab or other plane surface.

What I claim is—

1. The method of making black artificial marble by means of cement mixed with vegetable or animal black and water, filling the pores after crystallization with some cement already colored black, crystallizing the latter, polishing, and again filling the pores with blackened cement, then spreading on black liquid coloring matter and nitrate of iron, then washing and polishing and applying a second layer of black liquid, and finally washing and polishing, substantially as specified.

2. The combination, with the cement or plaster, of soluble glass and manganese, the same being mixed with the water employed in mixing the cement, substantially in the proportions stated.

3. The combination of a surface-coating with the cement or plaster when set, consisting of soluble glass mixed with the white of eggs, and a second coating composed of water and soluble glass in equal proportions, substantially as specified.

RICHARD GUELTON.

In presence of—
 MARCUS J. WALDHEIMER,
 JOHN S. AMES.